United States Patent [19]

Gianni et al.

[11] 4,383,802
[45] May 17, 1983

[54] OIL EQUALIZATION SYSTEM FOR PARALLEL CONNECTED COMPRESSORS

[75] Inventors: Sebastian J. Gianni, Wethersfield; Donald D. Schaefer, Farmington, both of Conn.

[73] Assignee: Dunham-Bush, Inc., West Hartford, Conn.

[21] Appl. No.: 280,041

[22] Filed: Jul. 6, 1981

[51] Int. Cl.³ .................. F25B 31/02; F25B 1/04; F04B 49/04; F04B 39/02
[52] U.S. Cl. .................................. 417/12; 417/426; 418/84; 418/87; 418/86; 62/193; 62/510
[58] Field of Search .................. 417/12, 13, 426; 418/84, 86, 87; 62/193, 510

[56] References Cited

U.S. PATENT DOCUMENTS

| | | |
|---|---|---|
| 2,253,623 | 8/1941 | Jordan ..................... 62/192 |
| 3,033,009 | 5/1962 | Berger et al. .............. 62/510 |
| 3,633,377 | 1/1972 | Quick ...................... 62/192 |
| 3,777,509 | 12/1973 | Muerch ..................... 62/192 |
| 4,180,986 | 1/1980 | Shaw ....................... 62/510 |

*Primary Examiner*—William L. Freeh
*Attorney, Agent, or Firm*—Sughrue, Mion, Zinn, Macpeak and Seas

[57] ABSTRACT

Parallel connected compressors are provided with an oil management scheme in which an oil equalization port on one compressor is connected via an oil return solenoid operated valve within a small diameter line to an injection port of a second compressor, and vice versa. When the oil level in one compressor drops to a level sensed by an oil float switch, the oil float switch changes state, the oil return solenoid operated valve is opened, feeding its injection port and energizing a one minute on delay timer. Failure of the oil float switch to reset itself causes the compressor to go off on oil failure, and the oil return solenoid operated valve is closed. If the oil float switch resets itself at any time during the first minute, upon resetting, an off delay timer is energized to keep the oil return solenoid operated valve open for an additional minute, and the compressor continues to operate.

6 Claims, 3 Drawing Figures

FIG.1

OIL EQUALIZATION SYSTEM FOR PARALLEL CONNECTED COMPRESSORS

FIELD OF THE INVENTION

This invention relates to multiple parallel connected compressors, and more particularly, to an improved oil management scheme for insuring an adequate oil supply to all of the various parallel connected compressors.

BACKGROUND OF THE INVENTION

In refrigerant or other gas distribution systems employing multiple compressors in parallel for compressing the gas and distributing the same through a common discharge manifold and wherein a common suction manifold feeds the suction side of the multiple compressors from the end use device or devices, there arises problems due to the fact that the gas tends to carry the lubrication oil and the oil may excessively accumulate within one or more of the compressors, while others are simply starved of oil.

Attempts have been made to provide bleed line connections between such compressors and utilize gas pressure differential between the compressors to circulate oil to the starved compressor. Where the compressors constitute hermetic units, the bottom of the casing of the compressor acts as an oil sump for receiving accumulated oil and for supplying oil to the moving parts of the compressor unit for cooling, lubrication and sealing. One such oil distribution arrangement is the subject matter of U.S. Pat. No. 3,237,852 assigned to the common corporate assignee and applied to a compressed gas distribution system employing multiple parallel hermetic motor compressor units of the reciprocating piston type.

Additionally, oil equalization schemes have been employed for parallel connected hermetic helical screw compressor units. One such oil equilization system is the subject of U.S. Pat. No. 4,179,248, also assigned to the common corporate assignee. Such helical screw compressor is formed of intermeshed rotary helical screws which are vertically oriented and mounted for rotation about parallel, vertical axes within a hermetic compressor casing. An electric drive motor for the helical screw rotors is vertically mounted above one of the helical screws and shaft connected thereto. Further, to assist in oil distribution and oil separation, the interior of the hermetic casing is maintained at compressor discharge pressure with the major portion of the separated oil accumulating within the bottom of the casing and rising to a level less than the vertical height of the intermeshed screws and well below the level of the electric motor. In the oil equalization system of the latter patent, the multiple helical screw rotary compressor units are connected in parallel across common suction and discharge manifolds. The discharge manifold opens to each unit casing well above the level of accumulated oil within the bottom of the hermetic casings acting as oil sumps. Oil bleed lines are provided for the compressors which open to the casing interior at an oil bleed port at the normal level of accumulated oil. The bleed lines are of small diameter and open at their opposite ends directly to the discharge manifold at points downstream of the connection between the discharge manifold and the hermetic casings for the screw compressors. Excessive accumulation of oil within one of the hermetic compressor casings causes the oil to bleed through its bleed line under a small pressure differential to the discharge manifold for redistribution to the remaining compressors through the system proper, that is, by being carried along with the compressed working fluid.

While such oil equilization system works adequately in terms of insuring that a compressor having an excess amount of oil feeds those compressors being starved of oil, the system is fraught with problems since of necessity, some of the oil is circulated with the working fluid in order to achieve redistribution of the oil from other hermetic compressor to the compressor which is starved of oil. Also, this requires a large quantity of oil to be in circulation in system which is not available to lubricate, etc.

It is, therefore, a primary object of the present invention to provide an improved oil equalization scheme for a multiple compressor gas distribution system employing parallel connected compressor units or the like in which, automatically, accumulated oil is bled from a unit having an ample reserve and circulated to the remaining compressors or compressor units which are starved of oil only when compressor(s) is/are in need of oil and in which such circulation is achieved without the necessity of using the compressed gas as the distribution means with no effect on refrigeration system or heat transfer components.

SUMMARY OF THE INVENTION

This invention is directed to a compressed gas distribution system wherein a plurality of hermetic, helical screw rotary compressor units are provided for example, and wherein each compressor unit includes; a hermetic outer casing defining a sump for the accumulation of oil, intermeshed helical rotary screws forming closed threads for gas compressor, and having a compressor inlet and outlet. The gas distribution system further comprises a suction manifold and a discharge manifold and means for connecting the suction manifold to the compressor inlet of each compressor unit. The compressor outlets open to the interior of the respective compressor unit casings such that the lower portion of each outer casing defines a sump for the accumulation of oil within the casing interior at compressor discharge pressure. Each casing is provided with a unit gas outlet port within the outer casing well above the level of accumulated oil which opens to the discharge manifold. Thus the compressor units are connected in parallel. The improvement comprises an oil equalization port within each casing below the normal level of accumulated oil and a small diameter oil equalization line connected at one end to an equalization port of one compressor and at the other end to an oil injection port opening to a closed thread of the intermeshed screws of the other compressor unit, at a point cut off from suction and discharge sides of that compressor. A control valve is provided within each oil equalization line. Means are provided for sensing a drop in oil level below the minimum operating oil level in each compressor unit and are connected to respective control valves such that the sensing means for one unit acts to open the control valve in the line feeding oil in the equalization line from the other compressor unit to effect a sharing of the available oil by the one unit which is oil starved, due to the pressure differential between said one unit sump and the other unit injection port.

Preferably, first time delay means are provided for delaying the closing of the control valve, regardless of the operation of the sensing means for insuring the maintenance of oil equalization flow from the other compressor unit to the one compressor unit to prevent hunting of the sensing means and excessive repetitive operation of the oil equalization system.

Further means are provided for automatically terminating operation of the compressor unit which is momentarily starved of oil after operation of the control valve means for a period of time normally effective to satisfactorily increase the amount of oil within the prior starved compressor unit, if such increase does not occur. Such means for automatically terminating operation includes second time delay means. The hermetic helical screw rotary compressor units may comprise three in number, and wherein means may be provided for connecting the oil equalization ports of at least two of the compressor units to a single oil equalization line leading to the injection of the compressor unit starved of oil. Other of said harmetic helical screw rotary compressor units may be so interconnected that means are provided for feeding oil through the oil equalization line to the compressor unit starved of oil directly from a single oil equalization port of one of the other compressor units and wherein another of said compressor units, not starved of oil, has its oil equalization port connected directly to an injection port of said other compressor unit which, in turn directly connects to the injection port of the oil starved unit.

DESCRIPTION OF PREFERRED EMBODIMENTS

Figure 1:
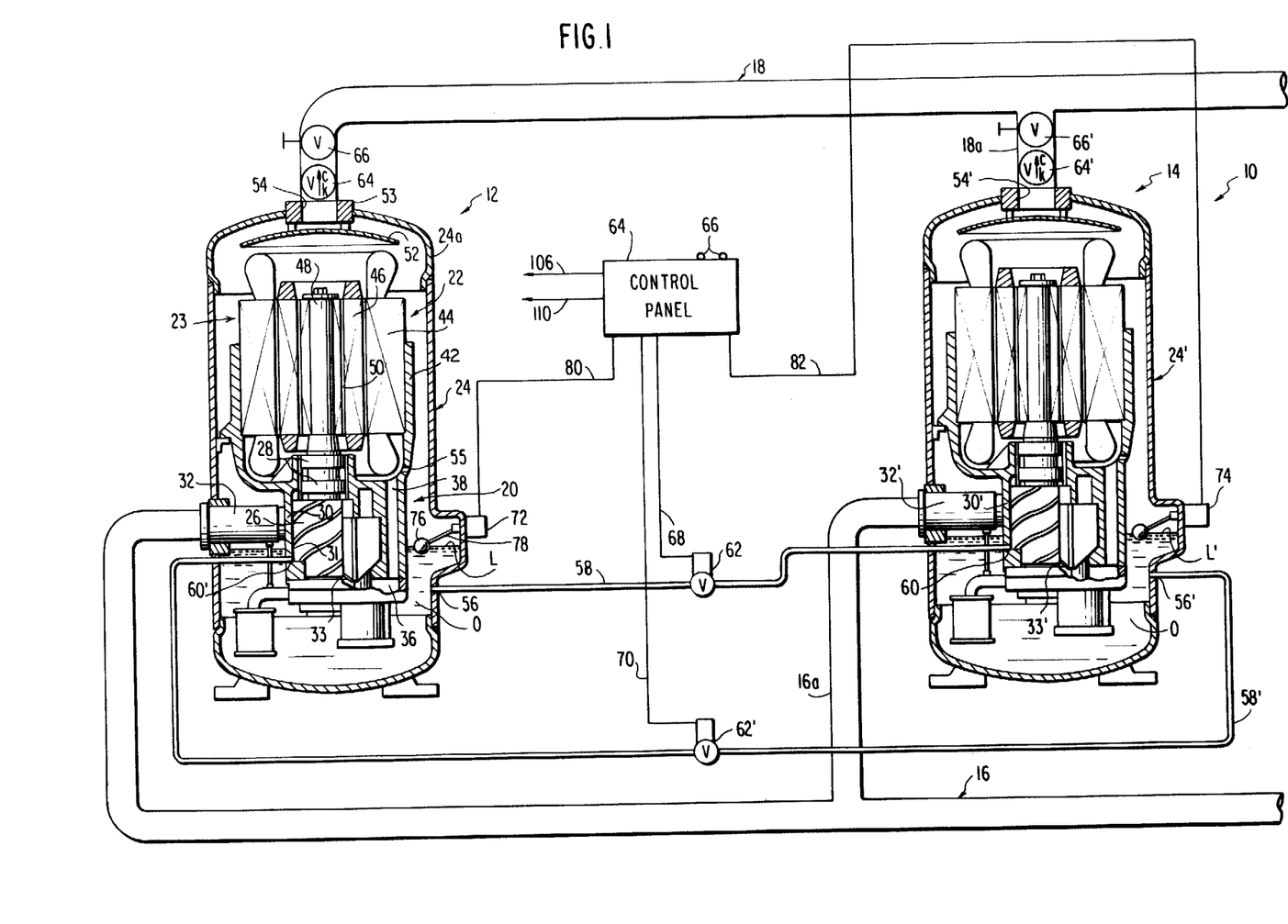
FIG. 1 is a partial schematic, partial sectional view of a portion of a compressed gas distribution system including parallel helical screw rotary compressor hermetic units employing the oil equalization system forming a preferred embodiment of the present invention.

Referring to FIG. 1, in this embodiment of the invention, the oil equalization system of the present invention is applied to a compressed gas distribution system indicated generally at 10. The gas distribution system involves a pair of helical screw rotary hermetic compressor units indicated generally at 12 and 14, respectively, and being connected in parallel by way of a common suction manifold indicated generally at 16 and a common discharge manifold indicated generally at 18.

The helical screw rotary compressor hermetic units are essentially identical to those appearing in U.S. Pat. No. 4,179,248 with some structural modifications. Each hermetic compressor unit, taking unit 12 as an example, involves two sections: a lower helical screw compressor section indicated generally at 20 and an upper section indicated generally at 22. Section 22 is comprised principally of an electric drive motor 23. The compressor is vertically oriented and the components are mounted within a hermetic casing 24. In the lower section, a pair of intermeshed helical screws or screw rotors are provided, only one of which is shown at 26. The screws are mounted for rotation about vertical axes by way of integral shafts supported by suitable bearings as at 28 within the lower inner casing 30. The screws rotate within suitable bores, as at 31 for helical screw 26, formed within the lower inner casing 30. Suction gas is provided to the intermeshed helical screws by way of a compressor suction conduit 32 which opens at its radially inboard end to bore 31 of the helical screw 26 at the compressor suction side, that is, adjacent the upper end of the intermeshed helical screws. The compressor suction conduit extends to outer casing 24 and opens exteriorly of the hermetic unit. It is directly connected to the end of the common suction manifold 16. The compressed working fluid or gas discharges from the lower end of the intermeshed screws, at a discharge port 33, which opens to a transverse discharge passage 36. Discharge passage 36 is continued within the inner casing by way of a vertical passage 38 with the compressed gas flowing into a cavity 40 within the upper inner casing 42, within which cavity is mounted the electric drive motor 23. The motor 23 may constitute an induction motor and is comprises a fixed stator 44 concentrically surrounding a central rotor 46.

Rotor 46 is mounted for rotation about a vertical axis on shaft 48 via bearings 28 which also mounts the helical screw 26. In that regard, shaft 48 is integral with the helical screw and the motor rotor and supports the same for rotation by way of the bearings 28. Additional bearings may be provided at the lower end of screw 26. The compressed gas at discharge pressure escapes to the interior of outer casing 24 through vertical passages 50 within rotor 46, as well as through the gap between rotor 46 and stator 44. Any oil carried thereby is separated from the discharge gas by way of centrifugal force or by way of impingement upon a deflector plate 52 prior to the discharge gas exiting from the outer casing 24. The working fluid or gas for the distribution system may comprise air or a suitable refrigerant such as freon or the like, depending upon system application. The outer casing 24 includes, at its upper end, a cover or end plate 24a which not only supports the deflector plate 52 but which is provided with a boss 53 defining the outer casing compressor discharge port 54. The port 54 couples to the common discharge manifold 18. Inner casing section 42 is provided with one or more radial openings 55, at the lower end of the motor section 22, for permitting oil O which is separated within the upper section 22 to flow downwardly to the bottom of the casing 24 for accumulation within the bottom of outer casing 24 which acts as an oil sump. The normal level L of accumulated oil is below the suction conduit 32 and well below the drive motor 23. As desired, the discharge manifold 18 may carry a check valve 64 and shut off valve 66 downstream of discharge port 54 of the hermetic unit.

The hermetic compressor unit 14 structurally is identical to that of unit 12, and elements thereof are provided with prime numerical designations. In that respect, suction conduit 32' of unit 14 is connected to the common suction manifold 16 thorugh a suction manifold branch pipe or conduit 16a. Likewise, the compressor discharge port 54' of unit 14 is connected to the common discharge manifold 18 by way of a discharge manifold branch pipe or conduit 18a. Branch pipe 18a includes a check valve 64' and shut off valve 66' corresponding to those of unit 12. The above description is essentially identical to that appearing in U.S. Pat. No. 4,179,248.

The present invention, however, is directed to a simplified but highly effective oil management scheme which differs from that of U.S. Pat. No. 4,179,248 and insures that oil is distributed between hermetic compressor units 12 and 14 without transfer by compressed working fluid through the system only when required and utilizes the fact that the accumulated oil O within each of the compressor outer casings 24, 24' is at full discharge pressure to accomplish the desired circulation between units. In that respect, for hermetic unit 12, the outer casing bears an oil bleed or oil equalization port 56 at a position below the normal level L of the oil accumulating within the sump and a small diameter oil bleed or oil equalization line 58, which may be a $\frac{3}{8}$ inch diameter or a $\frac{1}{4}$ inch diameter line. It extends from the oil bleed or oil equalization port 56 of compressor unit 12, with its opposite end extending through the outer casing 24' of unit 14, the line terminating at an injection port 60 within the inner casing lower section 30' where it opens to a closed thread cut off from the suction side of the machine and also cut off from the discharge side of the machine.

Within the oil equalization line 58, there is provided a first oil return solenoid operated valve 62. Similarly, the second hermetic unit 14 is connected in like fashion to hermetic unit 12 for permitting a flow of compensating oil to that unit should that unit start to run low on oil. A second oil equalization line 58' connects the outer casing 24' at oil equalization port 56' of unit 14 to an injection port 60' within inner casing lower section 30 at bore 31 for unit 12, the line 58' passing through outer casing 24. The injection port 60' opens to a closed thread of the intermeshed helical rotors or screws at a closed thread position, that is, cut off from both the suction side of the machine and the discharge side at 32 and 33, respectively. The oil equalization line 58' bears a second oil return solenoid operated valve 62', in similar fashion to a first such valve 62 within line 58. The solenoid operated valves 62 and 62' are normally closed valves, that is, when the solenoids are energized, the valves open to permit flow of oil under the pressure differential of the discharge pressure acting on the oil O within the sump of one compressor and the pressure of the closed thread of the second machine, which preferably is at near suction pressure determined by the physical location of the ports 60 or 60', as the case may be, with respect to the intermeshed screws of the respective units.

Control is effected electrically through a control panel 64, FIG. 1, which controls the application of electrical power from a source (not shown) connected to terminals 66. The oil return solenoid operated valves 62 and 62' are connected to the control panel by suitable lines as at 68 and 70. In order to sense the level of accumulated oil within the sumps of respective hermetic units 12 and 14, the illustrated embodiment of FIG. 1 employs float operated switches indicated generally at 72 for compressor unit 12 and 74 for compressor unit 14. Each of the switches may be of the type which includes a float 76 mounted at the end of an actuator arm 78, the float 76 rising and falling as the level of the oil O rises and falls within the sump of each hermetic unit. The switches 72 and 74 are connected to the control panel 64 by way of lines 80 and 82, respectively.

Figure 2:
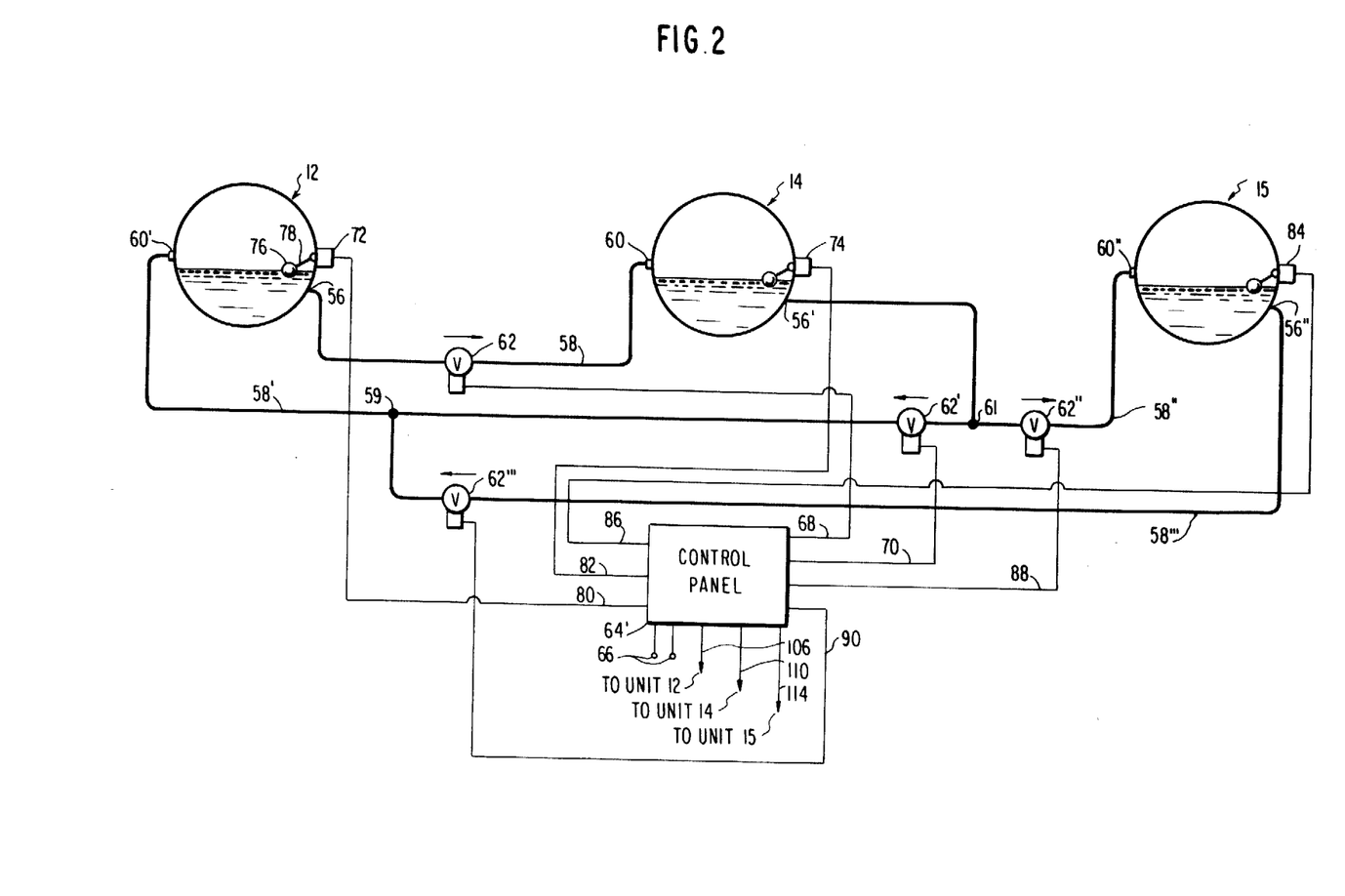
FIG. 2 is a partial schematic, partial sectional view of a portion of a compressed gas distribution system showing three parallel connected helical screw rotary compressor hermetic units employing an alternate embodiment of the oil equalization system of the present invention.
Figure 3:
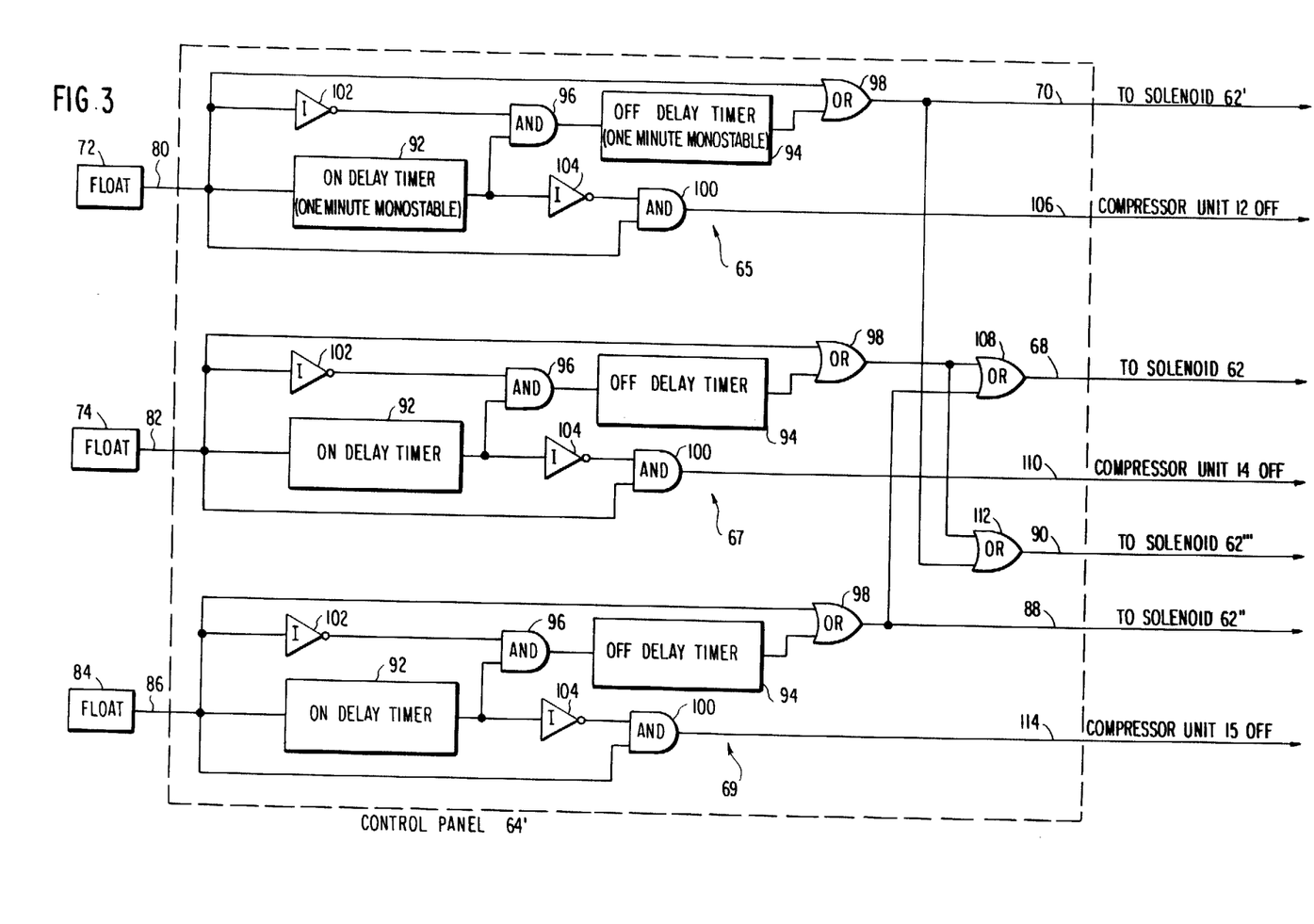
FIG. 3 is an electrical schematic diagram of the electrical control panel forming a part of the oil equalization system of FIG. 2.

Preferably, the control panel 64 is provided with two delay timers, a one minute on delay timer and a one minute off delay timer, whose make up and operation will be better appreciated by reference to the second embodiment illustrated in FIGS. 2 and 3. However, with respect to the simplified arrangement of FIG. 1, the operation is as follows. When the system is operating normally, both of the oil return solenoid operated valves 62 and 62' are closed with their solenoids de-energized. When the oil level in one compressor, for instance unit 12, drops to a level where the oil float switch 72 changes state, the electrical signal normally transmitted via line 80 to the control panel 64 terminates (changes from low to high) and the control panel causes a high control signal to be directed through line 70 to the oil return solenoid operated valve 62'. This energizes the solenoid of that valve and opens line 58' to permit oil to be bled from the sump of unit 14 and directed to the compressor of unit 12 via injection port 60', due to the pressure differential between the discharge pressure within the interior of casing 24' and acting on the oil within the sump of that casing, and the lesser pressure at the injection port 60' which may be at a pressure intermediate of suction and discharge pressure for the compressor intermeshed helical screw rotors of unit 12. The injection port 60' may be a refrigerant liquid or vapor injection port for the helical screw rotary compressor which is often employed in such units. Alternatively, it may be a separate injection port used purely for the oil management scheme. In any case, the opening of the normally closed solenoid operated control valve 62' permits oil to be injected into the compressed working fluid. Upon entering the stream of compressed working fluid, it passes upwardly into the upper section 22 of the compressor where it is separated from the working fluid and the oil then returns to the sump, thus raising the level of oil within the oil fed unit 12.

Simultaneously, and preferably under the detailed electrical system of its control panel 64', as evidenced in FIG. 3, and as similarly applied to control panel 64 of the embodiment of FIG. 1, there is energized a one minute on delay timer. If the oil float switch 72 has not reset itself within the one minute period, the compressor unit 12 goes off on oil failure and the oil return solenoid operated valve 62' is de-energized, with the valve closing. However, if the oil float switch 72 does reset itself at any time during the first minute, the instant it resets, a second, off delay timer is energized (also forming a part of the control panel 64 in accordance with the teachings of the embodiment of FIGS. 2 and 3), which maintains the oil return solenoid operated valve 62' open for an additional minute and the compressor continues to operate. The functions of the one minute on delay timer and one minute off delay timer are respectively; to insure that sufficient oil is fed from one compressor unit to the other to prevent cycling of the control scheme on and off continuously, and to insure that, of continued starvation of oil is experienced by the hermetic unit calling for more oil, at least that oil starved compressor will shut down to prevent its damage or destruction as a result of lack of oil over a sustained period of time.

Under typical operating parameters, it may take approximately ten seconds for a float switch to reset itself, and with the additional one minute off delay timer operation, this insures that the oil return solenoid operated valve controlling flow of oil from the hermetic unit having an excess of oil to that being starved is open for a total of 70 seconds. Such parameters may be readily varied. The on and off delay timers may be readily selected on the basis of the time desired to insure adequate redistribution of the oil between parallel compressor units.

Referring next to the embodiment of FIGS. 2 and 3, it may be seen that in addition to compressor hermetic units 12 and 14, there is added a third helical screw rotary compressor hermtic unit 15, in parallel with units 12 and 14, and feeding through a common discharge manifold and receiving the low pressure suction gas returning to the parallel compressor units through a common suction manifold. The schematic representation of FIG. 2 is even less detailed than that of the embodiment of FIG. 1 relative to the hermetic units. However, the electrical schematic of FIG. 3, shows in detail the make up of control panel 64' in this embodiment. Further, in the embodiment of FIGS. 2 and 3, like elements to those found in the first embodiment of FIG. 1 bear like numerical designations while additional components particularly with respect to the hermetic unit 15, are provided with double prime and triple prime designations.

Thus, compressor hermetic unit 12 and compressor hermetic unit 14 are identically connected and includes all of the elements of the prior embodiment. The control panel 64', in this case, is somewhat different from control panel 64 in the embodiment of FIG. 1, due to the presence of electronic circuit elements capable of interphasing all three compressor hermetic units 12, 14 and 15. The hermetic unit 12 includes an oil equalization port 56 opening to the sump below the level of oil within that compressor and permitting oil feed through oil equalization line 58 to the injection port 60 of hermetic unit 14. This is controlled by a float switch indicated generally at 72 which provides oil level sensing signals which change from low to high through line 80 to the control panel 64'. Line 68 from the control panel 64' feeds an output control signal of sufficient strength to the oil return solenoid operated valve 62 to cause oil to be supplied from unit 12 to unit 14 through the injection port 60 upon receipt of a high level oil level sensing signal through line 82 from float switch 74 associated with hermetic unit 14. If the level of the oil within hermetic unit 14, 12 drops, the low level sensing signal through line 80 causes energization of the solenoid of the oil return solenoid operated valve 62', thus permitting oil to flow from oil equalization port 56' of unit 14 through line 58' to the injection port 60' for hermetic unit 12.

As indicated previously, a third helical screw rotary compressor unit 15 is on the line and supplying compressed gas in parallel with hermetic compressor units 12 and 14. In that respect, the unit 15 is provided with an oil equalization port 56" which permits the feed of oil through oil equalization line 58'" to a point 59 where line 58'" intersects oil equalization line 58', thus permitting oil to enter the hermetic unit 12. It should be noted that unit 15 does not feed oil directly to unit 14, should unit 14 oil supply be depleted below the point where sensing float switch 74 operates, unit 14 receives oil directly only from unit 12. Further, as may be appreciated, there is an oil equalization line 58" which leads from point 61 within oil equalization line 58' and permits oil to be supplied from hermetic unit 14 to hermetic unit 15, line 58" terminating at injection port 60" of hermetic unit 15. Further, the hermetic unit 15 is provided with a float switch at 84 which provides sensor signals through line 86 to the control panel 64', a low level signal indicating an appropriate supply of oil within the sump of hermetic unit 15 or, a high level signal upon a drop in such oil level to the point where unit 15 requires additional oil to be supplied via unit 14.

The control panel selectively provides output control signals through line 88 to a third oil return solenoid operated valve 62" within oil equalization line 58" and via line 90 to a fourth oil return solenoid operated valve 62'" within oil equalization line 58'".

Thus, under a three compressor package, with all three compressor hermetic units 12, 14 and 15 operating in parallel to feed commonly to a load, four oil return solenoid operated valves are required. When all three compressor units are operating, if one loses its oil, two oil return solenoid operated valves open while the other two remain closed. As may be appreciated by reference to FIG. 2 and by further reference to FIG. 3, if compressor hermetic unit 12 requires oil, solenoid operated valves 62' and 62'" will open, permitting oil to flow through oil equalization lines 58' and 58'" to the injection port 60', the oil flows meeting commonly at point 59 within line 58' prior to entering the compressor through injection port 60'.

If compressor hermetic unit 14 requires oil, solenoid operated valves 62 and 62'" will open. This will permit oil to be fed through oil equalization line 58 from equalization port 56 of the hermetic unit 12 directly for injection within compressor 14 via injection port 60. Also, simultaneously, due to depleted oil within the sump of hermetic unit 14, oil is provided from the third hermetic unit 15 via equalization line 58'" and equalization port 56" to unit 12, and from unit 12 to unit 14.

As discussed previously in conjunction with the embodiment of FIG. 1, at the time there is a drop in level of oil within the sump of any one of the hermetic units 12, 14 or 15 to the extent where oil must be sent via the oil equalization lines from the other two compressor hermetic units to that needing oil, there is an immediate response. The oil return solenoid operated valves controlling the feeding of oil to that compressor whose oil level has dropped are energized and thus open while simultaneously there is a one minute on delay timer also energized. If the oil float switch does not reset itself within the one minute period, at least that particular compressor hermetic unit goes off on oil failure, and the oil return solenoid operated valves are closed.

If the oil float switch for the hermetic unit needing oil does reset itself at any time during the first minute, the instant it resets, a second timer (off delay timer) is energized, which keeps the oil return solenoid operated valves open for an additional minute and the compressor continues to operate. The maintenance of the oil return solenoid operated valves for that additional minute insures the raising of the oil level sufficiently to prevent the system from hunting and the float switch tending to oscillate between low and high level signal conditions.

Reference to FIG. 3 shows the details of the portion of the control circuit borne by the control panel 64' for the three unit compressor system of FIG. 2. Again, like elements bear like numerical designations.

In FIG. 3, the float switches 72, 74 and 84 are indicated schematically in block form to the left with their sensor signal lines 80, 82 and 86 supplying either low level or high level signals to the control circuit components within control panel 64'. Additionally, corresponding to the schematic representation of FIG. 2, output control line 70 leads to solenoid operated valve 62', output control line 68 leads to solenoid operated control valve 62, output control line line 88 leads to solenoid operated control valve 62" and output control signal line 90 leads to solenoid operated valve 62'''. Further, and in accordance with other aspects of the invention, panel output control signal lines lead to the individual compressor hermetic units for causing the compressor drive motors 23, 23' etc. to be shut down where the system is incapable of feeding oil to the starved compressor hermetic unit within the time span provided by the control scheme. In that regard, an output control signal line 106 leads to compressor hermetic unit 12 to provide a suitable off control signal when energized, while output control signal line 110 leads to compressor hermetic unit 14 and a similar line 114 leads to compressor hermetic unit 15, the signals acting to turn off these compressors in response to oil failures.

Internally, the control panel 64' includes three basically parallel and identical control circuit portions or sections as at 65 for compressor hermetic unit 12, 67 for compressor hermetic unit 14, and 69 for compressor hermetic unit 15. Turning first to section 65, the float switch 72 provides an initial or normal low level sensor signal via line 80, under high oil level conditions, which is fed to the control panel and which is directed by way of OR gate 98 directly to the solenoid operated valve 62' via control line 70. The float switches may simply provide zero to given voltage level change of state signals, i.e. ON-OFF output. Under compressor starved conditions the signal at line 80 changes from low to high. Simultaneously, a high signal is directed to AND gate 100 which leads to control signal line 106 tending to provide to the compressor hermetic unit 12 an "off" signal. However, no "off" signal results unless the float switch 72 does not turn itself off within one minute, this control being effected by a first delay timer 92 in the form of a one minute monostable element within a second line which also bears an inverter 104. Invertor 104 changes the output from delay timer 92 from high to low, and vice versa. This initially prevents AND 100 from energizing line 106.

Assuming that the opening of the solenoid operated valve 62' tends to flood the oil starved compressor 12 with oil within a short period of time (less than a minute) float switch 72 changes state as a result of a rise in level of the oil, going from high to low thus terminating a sensor high signal through line 80 leading to the one minute one delay timer 92. With AND gate 100 receiving a signal only on the line bearing the on delay timer 92 and not directly from float switch 72. Therefore, no control signal emanates within control signal line 106 tending to take the compressor unit 12 off the line.

If the oil float switch has not reset itself within the one minute period provided by the on delay timer 92, a signal is transmitted by way of the on delay timer 92, and inverter 104 as well as the direct line from line 80 to the AND gate 100, the presence of both high signals at the input of AND gate 100 causes an AND output control signal to pass through line 106 to compressor hermetic unit 12 acting to turn off the compressor.

If the oil float switch does reset itself at any time during the first minute, the instant it resets, a signal is provided by way of inverter 102 and AND gate 96 to the off delay timer 94, causing the OR gate 98 to continue to supply an output signal via line 70 to the solenoid operated valve 62'. Thus, the solenoid operated valve 62' remains open for an additional minute and the compressor continues to operate. This time should be sufficient to increase the level of oil within the oil starved compressor to an acceptable level.

The inverters 102 and 104 in control panel section 65 provides the desired inversion, that is, when the signal on the input side of the inverter goes high, its output goes low, and vice versa. To appreciate this, when the signal in line 80 goes high upon the float switch 72 changing state as a result of a drop or lowering in oil level within compressor hermetic unit 12, the high signal is seen at the input side of the inverter 102, at solenoid operated valve 62', the input to the one minute monostable on delay timer 92 and the input side of the AND gate 100. Immediately, upon the signal in line 80 going high, the on delay timer 92 operates and a continuous high signal emanates to the output side of the on delay timer 92, being fed to inverter 104 and changing its output from high to low. Therefore, no signal is provided line 106 to the compressor unit 12 to de-energize the compressor and turn the compressor off, while AND gate 100 sees one low and one high signal. While the high signal on the outlet side of the on delay timer 92 is fed to as one input to AND gate 96, the low signal on the output side of the inverter 102 feeding the opposite line to the AND gate 96 prevents the off delay timer from being energized. However, simultaneously with the float switch 72 rechanging state and the signal within line 80 going from high to low, inverter 102 causes a high signal at the AND gate 96 and when this is within the one minute time period provided by on delay timer 92, both high signals cause the AND gate 96 to open, energizing the off delay timer 94 and providing a further one minute high signal from OR gate 98 to the solenoid control valve 62'. Thus, the solenoid control valve 62' feeding oil through oil equalization line 58' to compressor hermetic unit 12 continues for a time period which is sixty seconds provided by the off delay timer 94 plus the time provided by the initial high signal from float switch 72 through a line leading to OR gate 98 in parallel with that of inverter 102, AND gate 96 and off delay timer 94. The totality of energization of the solenoid operated control valve 62' and the supply of oil through the oil equalization line 58' to compressor hermetic unit 12 may be ten seconds plus sixty seconds or seventy seconds in a typical system.

In the illustrated embodiment of FIGS. 2 and 3, control panel sections 67 and 69 generally mirror that of section 65, contain the same elements and are generally connected in the same manner. In that respect, section 67 is provided with an on delay timer 92, an off delay timer 94, AND gate 96, OR gate 98, a further AND gate at 100 and inverters 102 and 104, all corresponding to those of section 65. Float switch 74 provides an input signl changing from low to high as the float drops with the decreasing level of oil within compressor hermetic unit 14. The circuit further includes an additional OR gate 108 receiving the output of OR gate 98 for section 67 as well as an output signal from OR gate 98 forming a part of control panel section 69 and leading to the solenoid operated valve 62 connected by way of a control signal line 68. A control signal line 110 leads to the compressor hermetic unit 14 for shutting off the compressor if a low oil condition persists for unit 14, regardless of equalization system operation to overcome the problem.

The control panel section 69 provides similar and identically numbered elements in the control system to those enumerated and discussed with respect to sections 65 and 67, and there is no necessity to repeat this description. There is an additional OR gate 112 within the panel 64' responsive to signals from either line 70 as the output of OR gate 98 or line 168 which is the output of OR gate 98 for sections 65 and 67, respectively, for turning on a fourth solenoid operated valve 62'''. Technically, OR gate 112 is not really a part of section 69, it receives signals from sections 65 and 67 only and controls the solenoid operated valve 62''' within oil equalization line 58''' FIG. 2, leading from the oil equalization port 56'' of compressor hermetic unit 15 and supplying oil, at least directly, to the injection port 60' of the hermetic compressor unit 12.

In the illustrated embodiment of FIGS. 2 and 3, an arrangement is shown where each of the compressor hermetic units 12, 14 and 15 may be individually shut down while the others of the units are operating. Further, it must be appreciated that if one of the compressor units is shut down, it is still capable of supplying equalization oil under slight pressure from its oil equalization port when called upon to do so, if there is a drop in the oil level within the sumps of one of the remaining compressors which is still operating and on line. Alternatively, the system could be arranged so that upon oil failure at one hermetic unit all units are shut down. Under such an arrangement the outputs of AND gates 100 for each of the unit sections 65, 67 and 69 would feed commonly to an OR gate which, in turn, would feed to a control device for shutting down all three compressor hermetic units 12, 14 and 15 should one unit have sustained oil starvation over a period of time such as several minutes sufficient to initiate a control signal from any one of the AND gates 100.

Further, it should be appreciated that while the illustrated embodiments of the invention show oil equalization lines entering the starved compressor by way of an injection port, either as a separate oil injection port or a compressed working fluid vapor injection port, if the compressor does not have a vapor injection port or special oil injection port, the oil equalization lines may readily feed oil to the suction line of a given compressor hermetic unit instead. Under such conditions, the pressure differential remains for insuring high pressure feed of oil quickly and instantaneously to the oil starved compressor. Further, while the embodiment of FIGS. 2 and 3 illustrates three output signal control lines 106, 110 and 114 for feeding OFF signals to respective hermetic compressor units 12, 14 and 15 for shutting down the compressor drive motor in each instance, the embodiment of FIG. 1 incorporates only lines 106 and 110 for controlling units 12 and 14 in a similar manner.

It should be appreciated that while the illustrated embodiments of the invention show an oil equalization system wherein the signals to and from the control panel change in value from a low voltage level to a higher voltage level in response to the float switch change of state as result of a drop in oil level within a given compressor unit sump, such control signals may go from a zero value to a high value to effect opening of the solenoid operated valves controlling equalization oil flow through the equalization lines or alternatively, the float switches may operate such that the sensing signals vary from high state to low state to initiate such action or go from a given value to zero, i.e. from on to off.

It should also be appreciated that the oil management and control scheme may be handled electronically as an alternative to the electronic system as shown. In addition, the control scheme may be simplified by the utilization of a single timer with a fixed setting. Under such an arrangement, and as contemplated by the present invention, the oil return solenoid operated valve would remain open for one minute, even though the oil float switch resets. In the event that the oil float switch has not reset at the end of the one minute time period provided by the timer, the compressor would stop on the basis of an oil failure signal.

The oil management scheme while illustrated as being applicable to a helical screw compressor is aptly employed with other type parallel connected compressors such as a rotary vane compressor as long as they each employ a high side sump. Further, the compressors may be physically located at different levels, there is no necessity that the compressor units be physically located at the same vertical height. Finally, as may be readily apparent, while the hermetic helical screw compressor units of the illustrated embodiments are of the hermetic type with the electrical drive motor subjected to the compressor discharge pressure as is the oil accumulated within the sump, the compressors may be of the type in which the drive motor is exterior of the casing, as long as the compressor of the high side sump type.

While the invention has been particularly shown and described with references to preferred embodiments thereof, it will be understood by those skilled in the art that the foregoing and other changes in form and details may be made therein without departing from the spirit and scope of the invention.

What is claimed is:

1. A compressed gas distribution system comprising:
a plurality of compressor units,
said compressor units including a hermetic outer casing defining a sump for the accumulation of oil, means forming a closed volume for gas compression, and a compressor inlet and outlet,
said gas distribution system further comprising a suction manifold and discharge manifold,
means for connecting said suction manifold to the compressor inlets of respective compressor units,
the compressor outlets opening to the interior of the respective compressor unit casings such that the lower portion of each casing defines a sump for the accumulation of oil within the casing interior, at compressor discharge pressure,
each outer casing being provided with a unit gas outlet port well above the level of accumulated oil and opening to said discharge manifold such that said compressor units are connected in parallel,
the improvement comprising an oil equalization port within each outer casing below the normal level of accumulated oil,
small diameter oil equalization lines connected at one end to an oil equalization port of one compressor unit and at the other end to an oil injection port opening to the closed volume of another compressor unit at a point cut off from suction and discharge sides of the compressor, and vice versa
a control valve within each oil equalization line, and
means for sensing a drop in oil level below a minimum in each compressor unit and being connected to at least one of said control valves such that said sensing means for one unit acts to open the control valve in the equalization line leading from said other compressor unit to effect redistribution of the oil to said one unit and increase the amount of oil within that compressor unit, due to the pressure differential between said one unit sump and the other unit injection port and vice versa.

2. The compressed gas distribution system as claimed in claim 1, further comprising first time delay means for delaying closing of said control valve regardless of operation of said sensing means for insuring the maintenance of oil equalization flow from said other compressor unit to said one compressor unit to prevent hunting of said sensing means and excessive repetitive operation of said oil equalization system.

3. The compressed gas distribution system as claimed in claim 1, further comprising means including second time delay means for automatically terminating operation of the compressor unit which is momentarily starved of oil after operation of said control valve means for a period of time normally effective in equalizing the amount of oil within each compressor unit if such equalization does not occur.

4. The compressed gas distribution system as claimed in claim 2, further comprising means including second time delay means for automatically terminating operation of the compressor unit which is momentarily starved of oil after operation of said control valve means for a period of time normally effective in equalizing the amount of oil within each compressor unit, if such equalization does not occur.

5. The compressed gas distribution system as claimed in claim 1, wherein said plurality of hermetic helical screw rotary compressor units comprises at least three in number, and wherein said oil equalization system further comprises means for connecting the oil equalization ports of at least two of said compressor units to the oil equalization line leading to the injection port of the compressor unit starved of oil; whereby, multiple compressor units may simultaneously feed oil directly to said compressor unit starved of oil.

6. The compressed gas distribution system as claimed in claim 1, wherein said plurality of hermetic helical screw rotary compressor units comprises at least three in number, and wherein means are provided for feeding oil through said oil equalization line to the compressor unit starved of oil directly from an oil equalization port of one of said other compressor units, and wherein another of said compressor units not starved of oil has its oil equalization port connected directly to an injection port of said other compressor unit whose equalization port is directly connection to the injection port of the oil starved compressor unit.

* * * * *